C. W. STANTON.
PROCESS OF DRYING CORN.
APPLICATION FILED MAY 22, 1913.
1,086,950.
Patented Feb. 10, 1914.
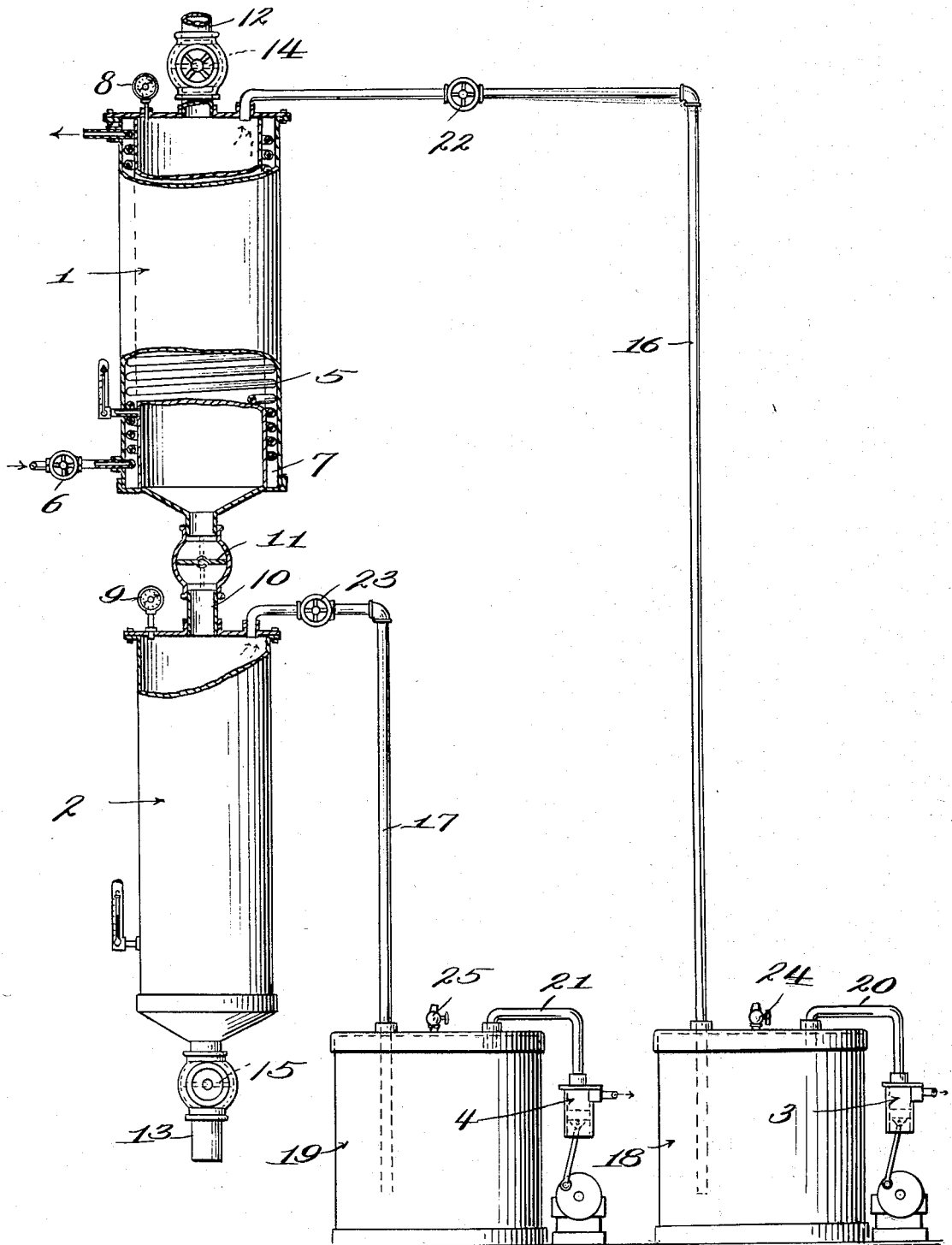
Witnesses:
Inventor
Charles W. Stanton
by
Attorney

UNITED STATES PATENT OFFICE.

CHARLES W. STANTON, OF MOBILE, ALABAMA, ASSIGNOR TO THE MOBILE COMPANY, OF MOBILE, ALABAMA, A CORPORATION OF ALABAMA.

PROCESS OF DRYING CORN.

1,086,950. Specification of Letters Patent. Patented Feb. 10, 1914.

Application filed May 22, 1913. Serial No. 769,335.

*To all whom it may concern:*

Be it known that I, CHARLES W. STANTON, a citizen of the United States, residing at Mobile, in the county of Mobile and State of Alabama, have invented new and useful Improvements in Processes of Drying Corn, of which the following is a specification.

The present invention has reference to the drying of shelled corn, and it proposes, briefly, an improved process of the general character specified whereby the absorption of moisture by the corn during drying is prevented, and the injurious results consequent upon such absorption are avoided.

The improved process may be carried out in any apparatus suitable therefor, but preferably in the apparatus hereinafter described, a part-sectional, diagrammatic side elevation of this apparatus being illustrated in the accompanying drawing. As shown therein, such apparatus consists, primarily, of a pair of superposed vessels 1 and 2 of suitable size and shape which are connected with the vacuum pumps 3 and 4, respectively. The upper vessel is supplied with heat in any desired manner, the drawing showing the heating as effected by means of a steam coil 5 having a controlling valve 6 at its inlet, which coil is disposed within a jacket 7 provided on the vessel. Both vessels are of air-tight construction, and are sufficiently strong to withstand a high vacuum, the expression "high vacuum" being included to indicate a vacuum above 25, under barometric conditions of 30, or a similar ratio where the barometric conditions are different. The two vessels are equipped with gages, designated by the numerals 8 and 9, and are connected by a spout 10 which constitutes the means for discharging the dried corn from the upper, or heating vessel to the lower or cooling vessel, this spout being provided with a suitable gate valve 11. The corn is supplied to the upper vessel through the spout 12 and is ultimately discharged from the lower vessel through the spout 13, the passage of the corn through the two spouts being controlled by the gate valves 14 and 15.

The afore-mentioned connections between the heating and cooling vessels 1 and 2 and the pumps 3 and 4 are here shown as consisting of a pair of pipes 16 and 17 which lead from the tops of the corresponding vessels through the tops of a pair of air-tight exhausting tanks or chambers 18 and 19 which, in turn, are connected by a second pair of pipes 20 and 21 that lead from their tops to the pumps 3 and 4, respectively. The horizontal sections of the first-mentioned pipes are equipped with cut-off valves 22 and 23, respectively, and a pair of additional valves 24 and 25 are also provided for admitting air into the two vessels at the conclusion of the heating and cooling operations, the last-mentioned valves being represented as applied to the tops of said tanks.

In carrying out the process, the corn is introduced into the upper vessel 1, the valve 11 in the connecting spout being closed at that time, as will be understood, after which the pump 3 is started. When the gage 8 registers a vacuum above 25 in the said vessel, the valve 6 is opened to admit steam into coil 5, and the heating of the corn then commences. This heating is continued until the desired amount of moisture is driven off from the corn, which is determined in the usual manner, whereupon the valve 11 is opened and the dried corn discharged, while still hot, through the spout 10 into the lower vessel 2. The pump 4, with which the receptacle just mentioned is connected, has previously been started, so that the gage 9 registers a similar vacuum in that receptacle before the transfer of the corn thereinto takes place. Accordingly, since the pump 4 continues to run during the entire time that the corn remains in the lower vessel, cooling will commence almost immediately, and at the conclusion of this operation, the valve 15 is opened and the corn discharged through the spout 13, from the apparatus in a normal condition.

The two pumps 3 and 4 operate independently of each other, as will be understood, and, in fact, the heating and cooling operations are themselves independent, although they preferably take place at the same time, the heating vessel being refilled immediately after each discharge of the dried grain into the cooling vessel. The provision of the several valves enables the pumps to be cut out during the filling, transferring and discharging oper.tions, and, also, admits of the suction being regulated at will. Moreover, since the amount of moisture in the corn can be readily determined by means of one of the ordinary testing machines before the initial filling of the heating vessel takes place, it will be apparent that the heating operation may be terminated as soon as the necessary quantity of moisture has been extracted, thereby reducing the shrinkage ordinarily resulting from drying.

One important feature of the process, as above outlined, resides in the relation of the moisture-extracting operation to the heating: the tendency of the corn, when heated, under ordinary conditions, (i. e., with access of air), is to germinate, which obviously causes its deterioration, but inasmuch as the moisture is completely extracted during heating, according to the present process, this germination will be wholly avoided, thereby leaving the corn in a much more perfect condition at the conclusion of the process than was heretofore possible.

While the improved process has been described in connection with the drying of shelled corn, and is, in fact, especially applicable to that grain, it may, nevertheless, be carried out in connection with the drying of rice and other grains, so that no limitation to the treatment of the grain first mentioned is contemplated.

Having described my invention, I claim:

1. The hereindescribed process of drying grain which consists in successively heating and cooling the grains in air-tight receptacles; and maintaining a constant high vacuum in said receptacles throughout such treatment.

2. The hereindescribed process of drying grain which consists in heating the grain in an air-tight receptacle; maintaining a vacuum of above 25 in said receptacle throughout the entire heating operation to extract the moisture from the grain; discharging the heated grain into a second air-tight receptacle at the conclusion of said operation; and maintaining a constant vacuum of above 25 in the second receptacle to cool the grain.

3. The hereindescribed process of drying grain which consists in heating the grain in an air-tight receptacle; maintaining a vacuum of above 25 in said receptacle throughout the entire heating operation to extract the moisture from the grain; discharging the heated grain without access of air into a second air-tight receptacle at the conclusion of said operation; and maintaining a constant vacuum of above 25 in the second receptacle to cool the grain.

4. A grain drier comprising a pair of communicating, air-tight vessels; means for heating one of said vessels; and a separate air-pump connected with each of said vessels for creating a high vacuum therein.

5. A grain drier comprising a pair of superposed air-tight vessels and a spout connecting the lower end of the upper vessel with the upper end of the lower vessel, the upper vessel being provided at its top with an inlet spout, and the lower vessel at its bottom with a discharge spout; a gate valve arranged in each of said spouts for controlling the passage of the grain into and from said vessels; and a separate vacuum pump connected with each vessel for creating a high vacuum therein.

In testimony whereof I have hereunto set my hand in presence of two subscribing witnesses.

CHARLES W. STANTON.

Witnesses:
Chas. S. Hyer,
H. C. McCarteney.